United States Patent
Ueno

(10) Patent No.: US 9,369,025 B2
(45) Date of Patent: Jun. 14, 2016

(54) VIBRATION MOTOR WITH CAPTURED WEIGHT

(71) Applicant: NIDEC COPAL CORPORATION, Tokyo (JP)

(72) Inventor: Sayaka Ueno, Tokyo (JP)

(73) Assignee: NIDEC COPAL CORPORATION, Tokyo (JP)

( * ) Notice: Subject to any disclaimer, the term of this patent is extended or adjusted under 35 U.S.C. 154(b) by 256 days.

(21) Appl. No.: 14/080,592

(22) Filed: Nov. 14, 2013

(65) Prior Publication Data

US 2014/0139051 A1 May 22, 2014

(30) Foreign Application Priority Data

Nov. 16, 2012 (JP) ................................ 2012-252431

(51) Int. Cl.
| | |
|---|---|
| H02K 5/24 | (2006.01) |
| H02K 33/00 | (2006.01) |
| H02K 5/00 | (2006.01) |
| H02K 7/06 | (2006.01) |
| H02K 7/10 | (2006.01) |

(52) U.S. Cl.
CPC ...................... *H02K 7/063* (2013.01)

(58) Field of Classification Search
CPC ..................................................... H02K 7/065
USPC .......................... 310/40 MM, 81, 215, 28, 51
See application file for complete search history.

(56) References Cited

FOREIGN PATENT DOCUMENTS

| JP | 08079995 A | * | 3/1996 |
|---|---|---|---|
| JP | 2002-219411 | | 8/2002 |
| JP | 2003-164804 | | 6/2003 |
| JP | 2003181379 A | * | 7/2003 |

* cited by examiner

*Primary Examiner* — Dang Le
*Assistant Examiner* — Jose Gonzalez Quinone
(74) *Attorney, Agent, or Firm* — Troutman Sanders LLP

(57) ABSTRACT

In a vibration motor, insulators are provided with protrusions that are positioned radially inward from extension portions, provided at an end portion of a body of a weight, and that restrict radial movement of the extension portions. In addition, in the vibration motor, the weight is supported by the protrusions of the insulators so as to prevent the weight from falling radially inward. Therefore, when using the vibration motor, the situation in which a force acting radially inward upon the weight is supported only by a weld or an adhesive is prevented from occurring, so that a gradual reduction in the securing strength of the weight does not occur. The insulators can prevent the weight from falling when assembling the vibration motor.

4 Claims, 15 Drawing Sheets

VIBRATION MOTOR WITH CAPTURED WEIGHT

CROSS REFERENCES TO RELATED APPLICATIONS

The present invention contains subject matter related to Japanese Patent Application No. 2012-252431 filed in the Japan Patent Office on Nov. 16, 2012, the entire contents of which are incorporated herein by reference.

BACKGROUND OF THE INVENTION

1. Field of the Invention

The present invention relates to a vibration motor including a weight secured to a core.

2. Description of the Related Art

Hitherto, Japanese Unexamined Patent Application Publication No. 2002-219411 exists as a document that describes a technology of such a field. A weight used in a vibration motor discussed in this document includes a columnar body and a projecting portion formed at one end of the body. The shape of the body in cross section corresponds to the shape of a space, that is, a core slot formed between two coil winding portions of a core. When the body of the weight is inserted in the core slot, the body of the weight closely contacts surfaces of coils and inner surfaces of tooth portions at end portions of the coil winding portions, so that the position of the body of the weight is restricted in a plane that is perpendicular to an axial direction. Further, the position of the weight in the axial direction is restricted by contact of the projecting portion with surfaces of the tooth portions of the coil winding portions at a final stage of the insertion of the weight. The weight inserted in this way is secured by laser welding to a boundary region between a portion of the weight that is exposed to the outside and the tooth portions of the coil winding portions.

In the above-described vibration motor of the related art, the weight closely contacts the surfaces of the coils and the inner surfaces of the tooth portions at the end portions of the coil winding portions, so that the position of the weight in a plane that is perpendicular to the axial direction is restricted. This prevents the weight from falling towards an inner side in the core slot. However, since, when the weight is installed in the vibration motor or the vibration motor is used, the weight contacts the coils, the coils may break. In addition, when, in order to prevent the coils from breaking, the weight is formed with a size that does not allow the surfaces of the coils to contact the weight, that is, the weight is reduced in size, the weight tends to fall towards the inner side in the core slot when the weight is being installed in the vibration motor. Therefore, laser welding tends to be improperly performed when securing the weight to the tooth portions of the coil winding portions. Further, since, when using the vibration motor, a force acting radially inward upon the weight is only supported by the weld, an unreasonable force continues to act upon the welded portion. This may gradually reduce the securing strength of the weight.

Japanese Unexamined Patent Application Publication No. 2003-164804 is another example of a related art.

SUMMARY OF THE INVENTION

Accordingly, it is an object of the present invention to provide a vibration motor in which a weight is reliably secured to a core and the securing strength of the weight is prevented from being reduced.

According to an aspect of the present invention, there is provided a vibration motor including a core including a plurality of radially disposed arms and a plurality of tooth portions, each tooth portion being provided at an end portion of the corresponding arm; an insulator that is disposed on a surface of the core and that is formed of an electrical insulating material, a coil being wound around the insulator disposed on the arms; and a weight that is disposed in a core slot provided between adjacent arms of the plurality of arms. In the vibration motor, the weight includes a body and extension portions, the body being inserted in the core slot, the extension portions being provided at an end portion of the body and being disposed on the corresponding tooth portions at the adjacent arms. In addition, the insulator includes protrusions that are positioned radially inward from the extension portions and that restrict radial movement of the extension portions.

In the vibration motor, the insulator is provided with protrusions that are positioned radially inward from the extension portions, provided at an end portion of the body of the weight, and that restrict radial movement of the extension portions. In addition, in the vibration motor, the weight is supported by the protrusions of the insulator so as to prevent the weight from falling radially inward. Therefore, when using the vibration motor, the situation in which a force acting radially inward upon the weight is supported only by a weld or an adhesive is prevented from occurring, so that a gradual reduction in the securing strength of the weight does not occur. In particular, if tungsten is used for the weight and iron is used for the core, the weight and the core are less reliably joined to each other due to a difference between the melting points of tungsten and iron; and, if an adhesive is used, the adhesive strength of the adhesive itself is reduced with the passage of time. Therefore, if, as in the present invention, the weight is supported by the protrusions of the insulator so as to prevent the weight from falling radially inward, it is possible to reliably prevent the weight from being removed from the core. Further, if the weight tends to fall radially inward when assembling the vibration motor, improper securing of the weight with a weld or an adhesive tends to occur, as a result of which the securing strength is less reliably ensured. The structure according to the present invention can also prevent such a situation from occurring. The weight does not need to be supported by the coil so as to prevent the weight from falling radially inward. This makes it possible to reliably prevent breakage of the coil occurring as a result of contact of the weight with the coil. Since the protrusions of the insulator function to restrict the position of the weight when assembling the vibration motor, the vibration motor is easily assembled.

The protrusions may restrict peripheral-direction movement of the weight by contacting free ends of the weight in a peripheral direction of the extension portions.

If such a structure is used, the position of the weight is more reliably restricted when assembling the vibration motor, improper securing of the weight with a weld or an adhesive is less likely to occur, and the securing strength is more reliably ensured.

Each protrusion may be disposed radially outward with respect to a straight line connecting both ends of the corresponding tooth portion of the core.

If such a structure is used, when the coil is to be wound around the arms of the core, it is possible to prevent the protrusions of the insulator from hindering the winding of the coil, and from reducing the amount of coil that is wound around the arms. Further, the protrusions can reliably control ends of the positions of the winding of the coil. This makes it possible for the coil to be reliably wound. Since, in a flat vibration motor, the space for setting the weight is very small, a space for setting the weight can be reliably provided in a small volume.

According to the present invention, it is possible to reliably secure the weight to the core and to prevent a reduction in the securing strength of the weight.

DESCRIPTION OF THE PREFERRED EMBODIMENTS

A vibration motor according to a preferred embodiment of the present invention is hereunder described in detail with reference to the drawings.

Figure 1:
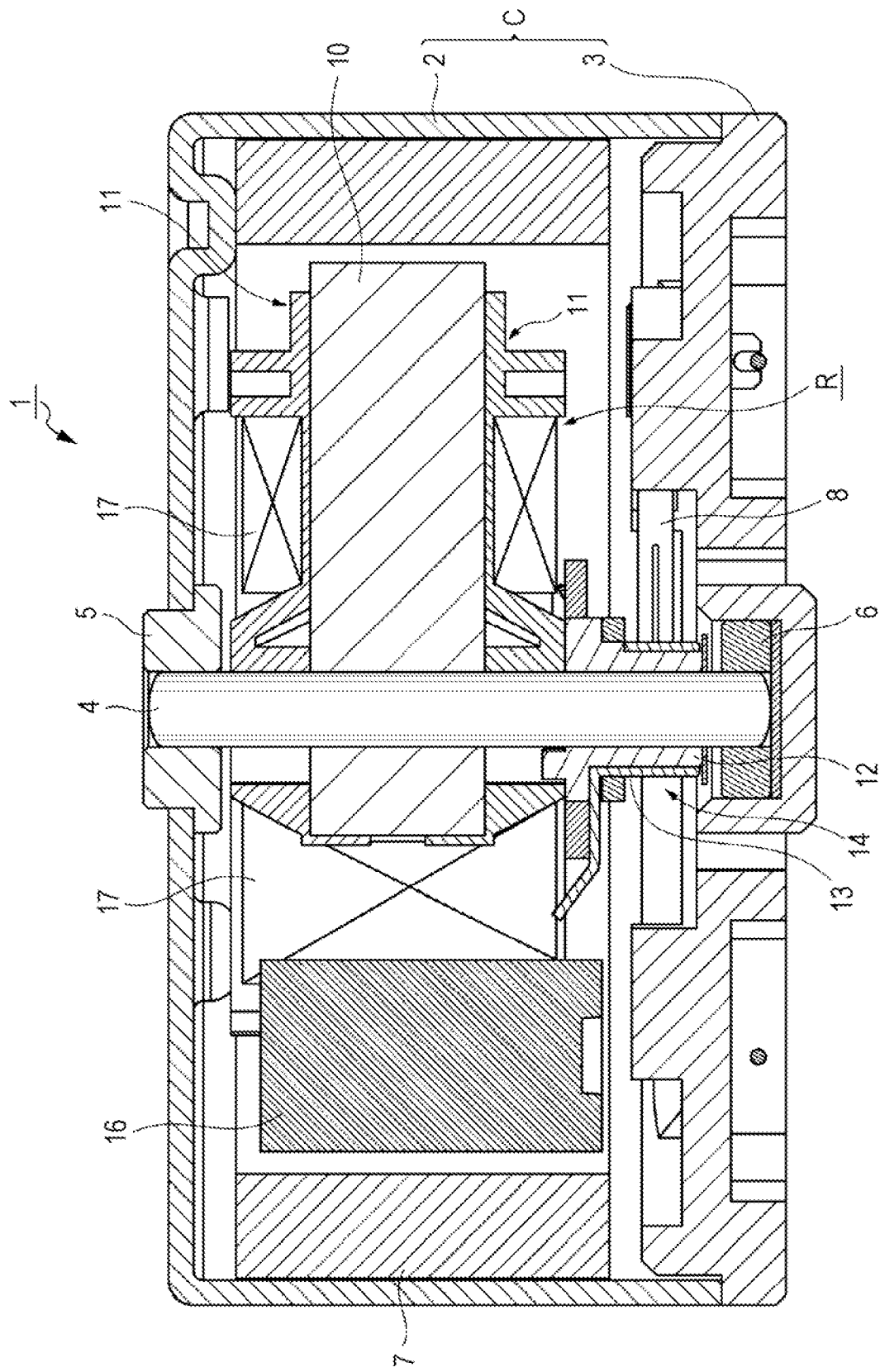
FIG. 1 is a sectional view of a vibration motor according to an embodiment of the present invention.

As shown in FIG. 1, a flat vibration motor 1 is a 2-pole, 3-slot type, and has a diameter of approximately 24 mm and a thickness of approximately 13 mm and is, thus, reduced in size. The vibration motor 1 is provided with a motor case C including a flat outer cylindrical portion 2 and a bracket 3. One end of the outer cylindrical portion 2 is open. The bracket 3 is provided for covering the open side of the outer cylindrical portion 2. A rotor assembly R and a magnet 7 are accommodated in the motor case C.

A bearing 5 for supporting one end of the shaft 4 is secured to the center of the outer cylindrical portion 2 formed of a magnetic material such as iron. A bearing 6 for supporting the other end of the shaft 4 is press-fitted and secured to the center of the bracket 3 formed of a resin material. The annular magnet 7 is joined and secured to an inner peripheral surface of the outer cylindrical portion 2. A brush piece 8 is mounted to the bracket 3.

Figure 2:
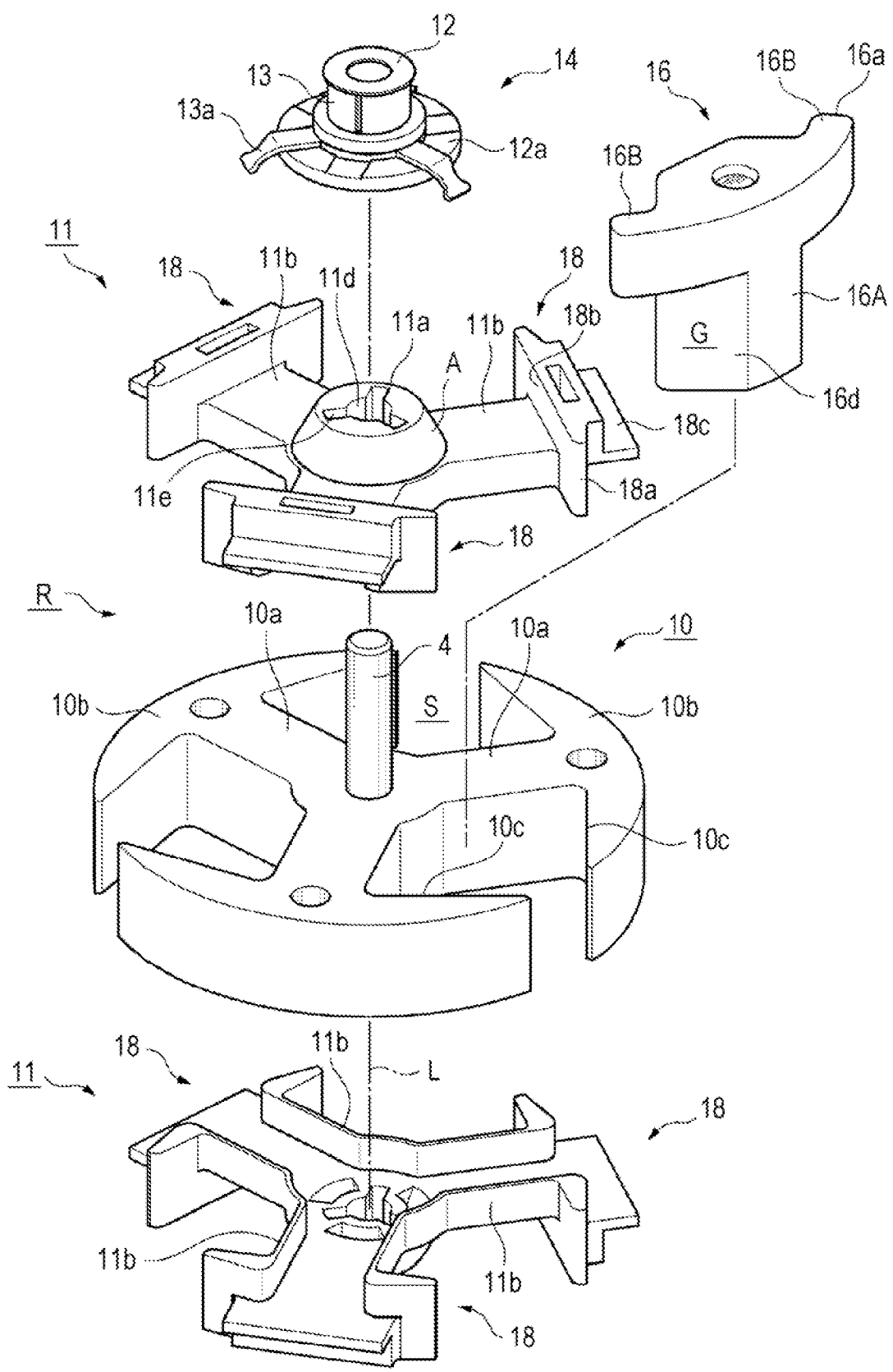
FIG. 2 is an exploded perspective view of a rotor assembly.
Figure 3:
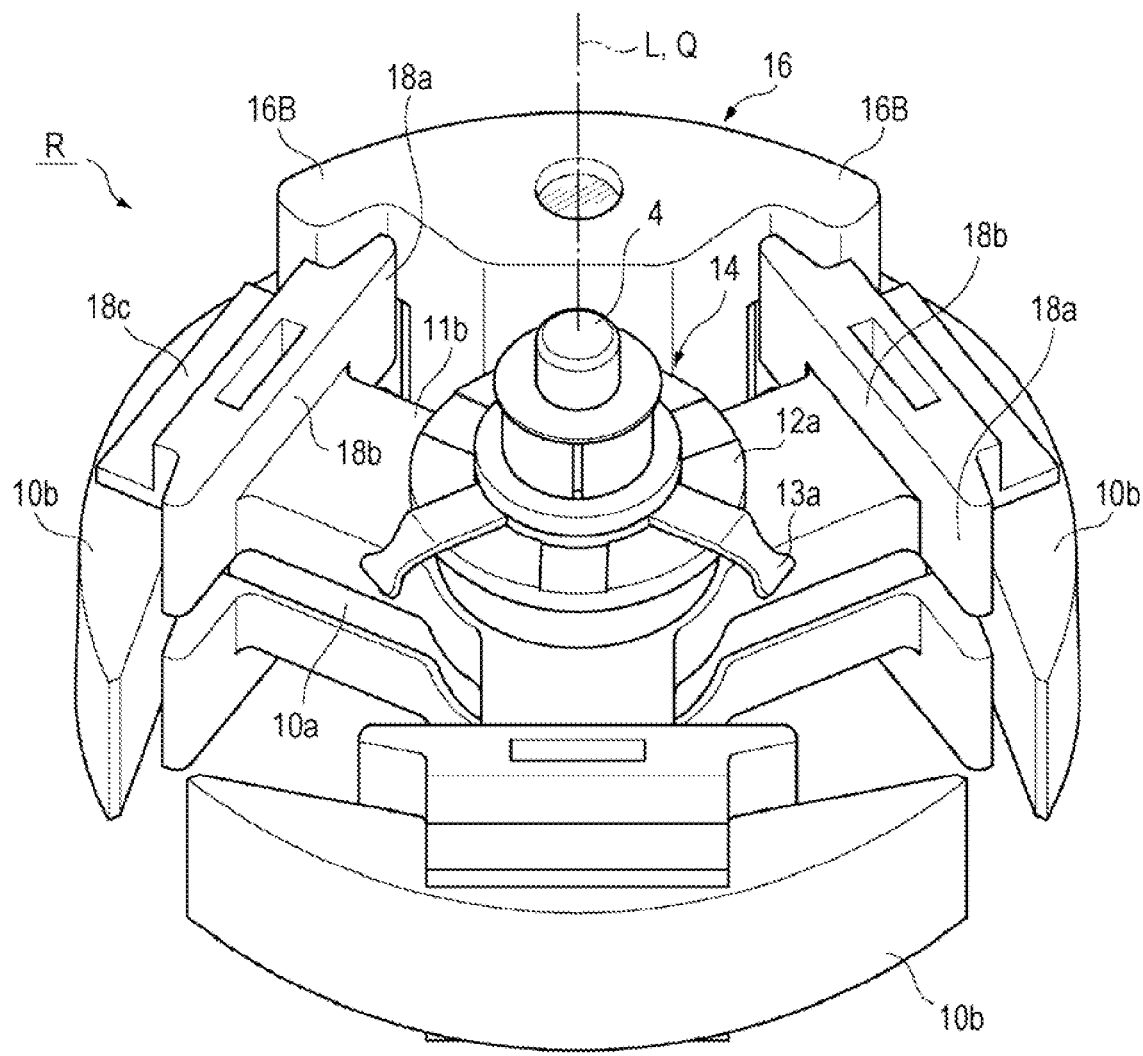
FIG. 3 is a perspective view of the rotor assembly.
Figure 4:
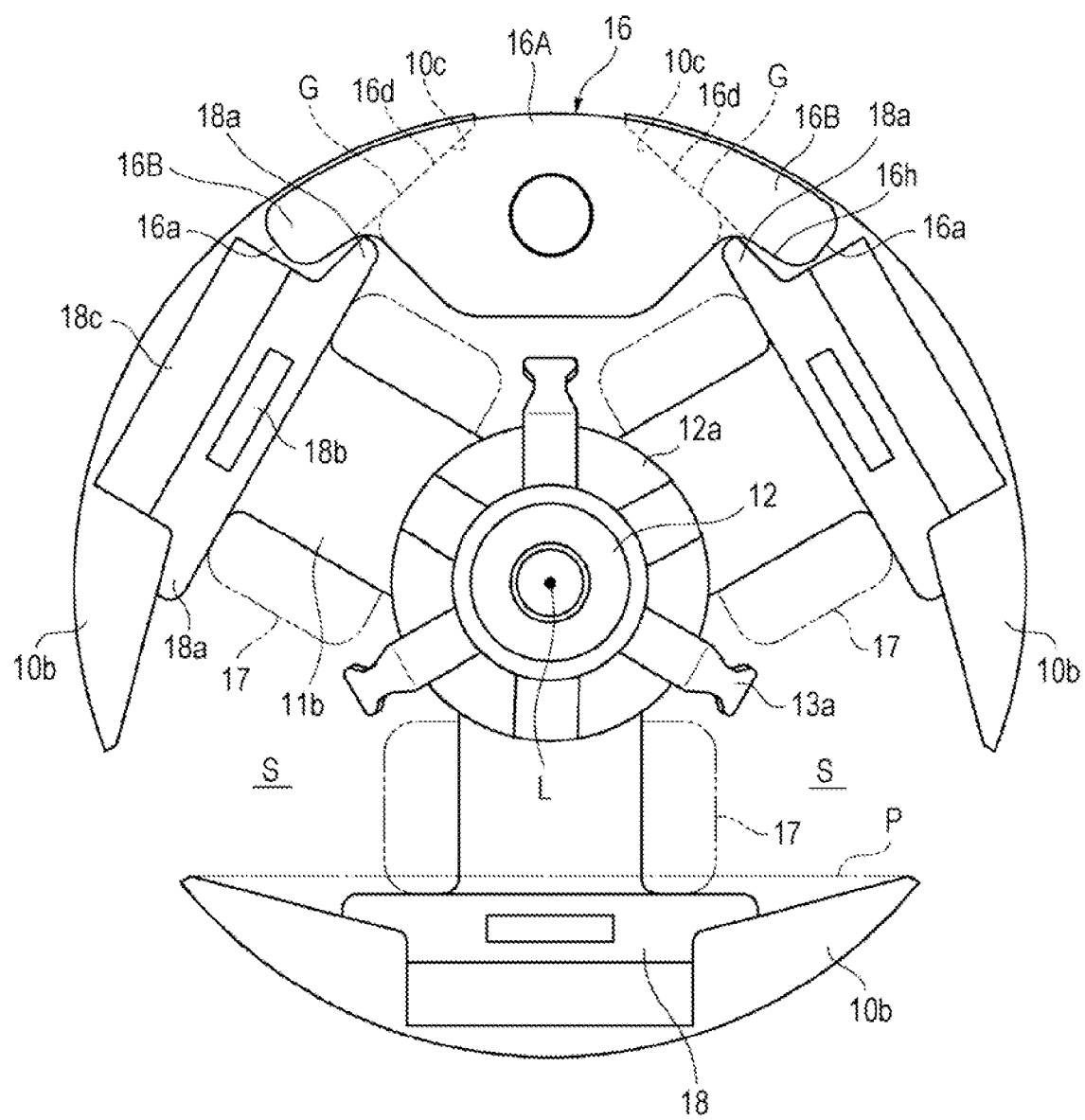
FIG. 4 is a plan view of the rotor assembly.
Figure 5:
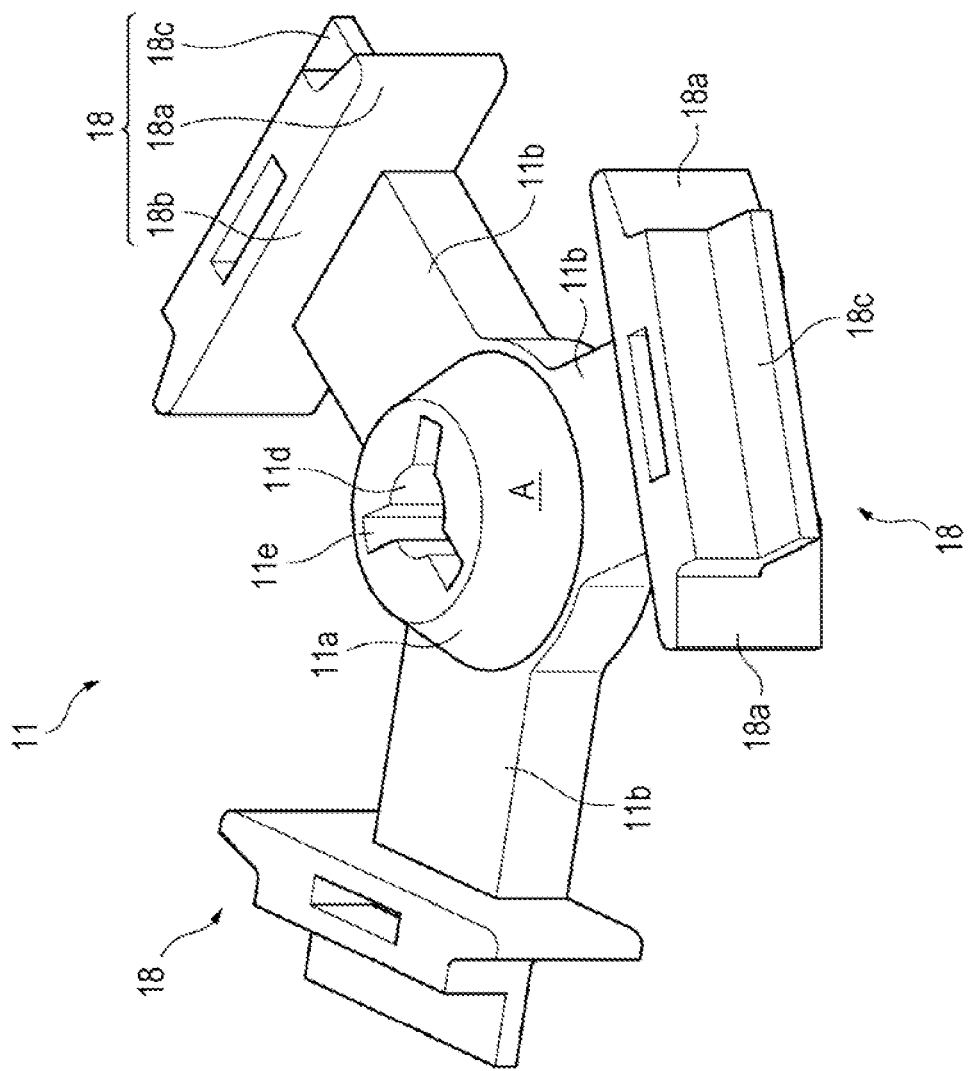
FIG. 5 is a perspective view of an insulator
Figure 6:
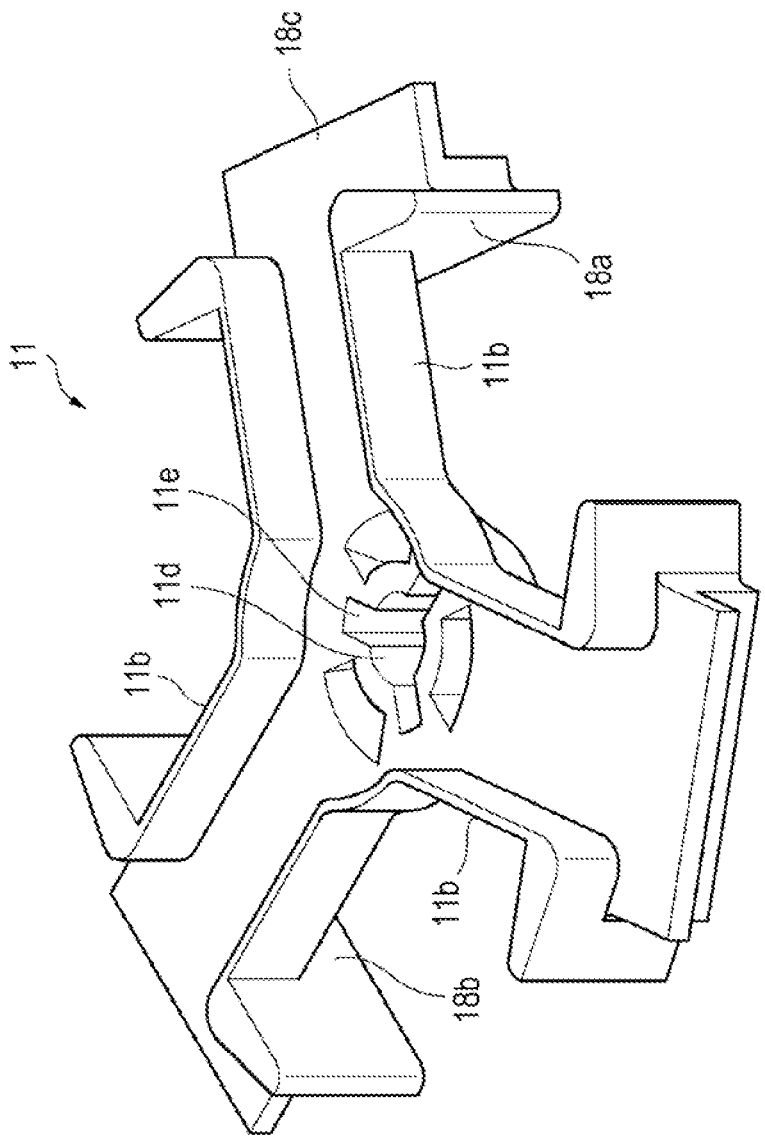
FIG. 6 is a perspective rear view of the insulator.
Figure 7:
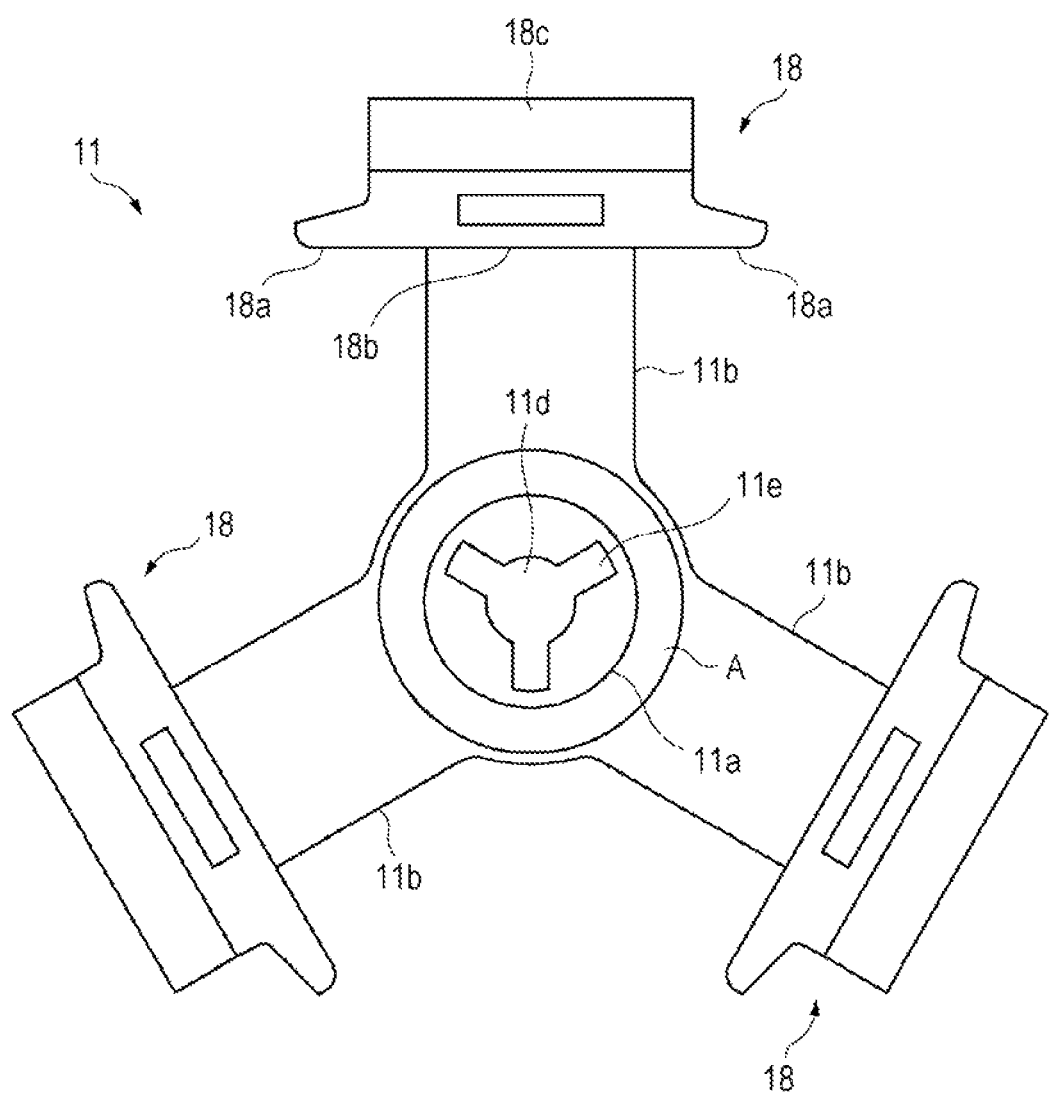
FIG. 7 is a plan view of the insulator.
Figure 8:
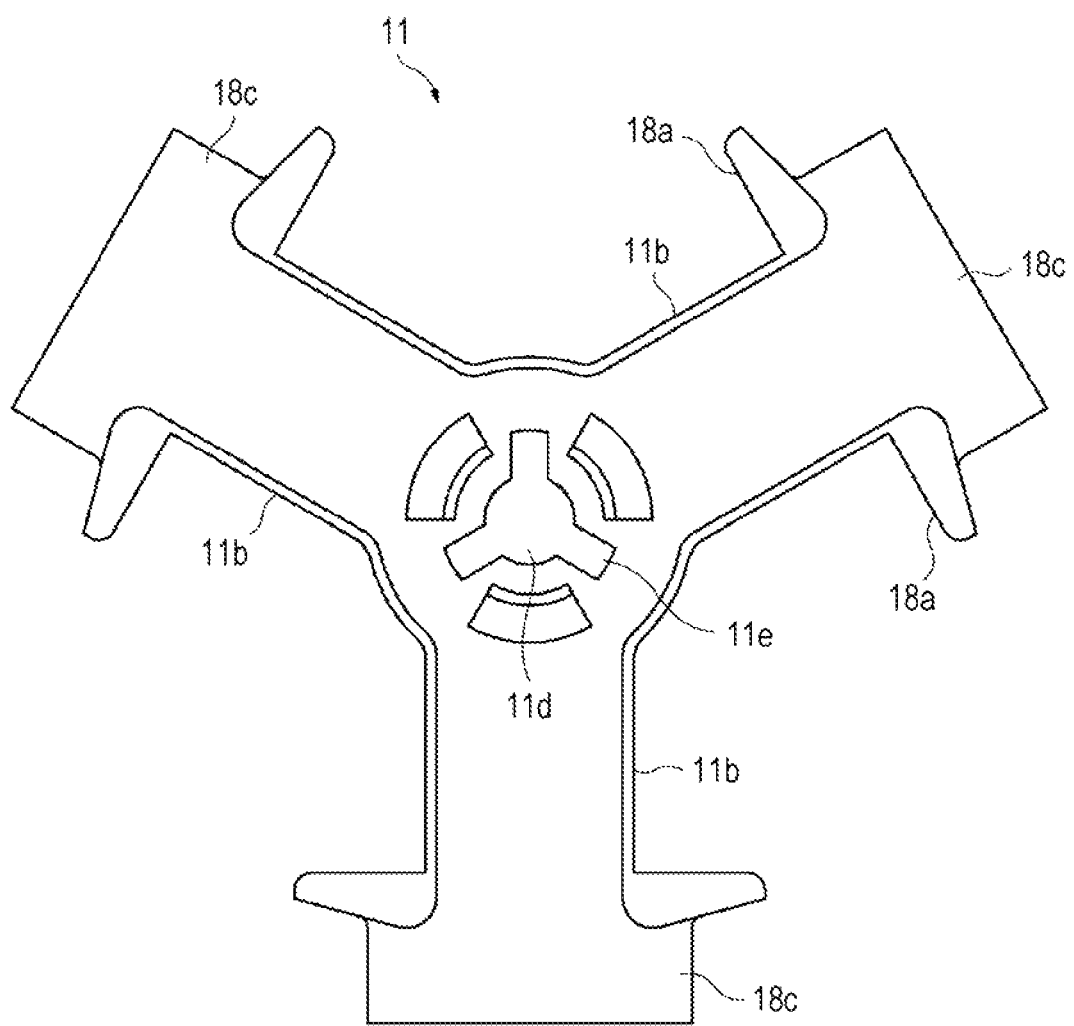
FIG. 8 is a bottom view of the insulator.
Figure 9:
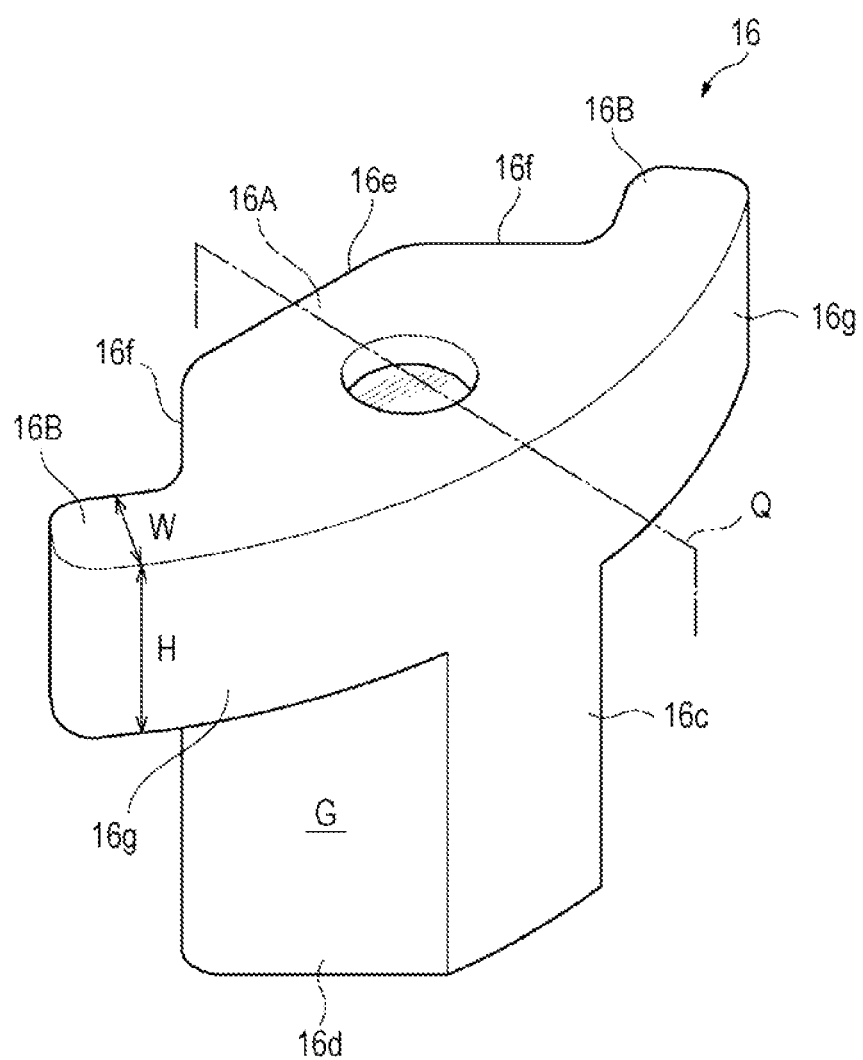
FIG. 9 is a perspective view of a weight.
Figure 10:
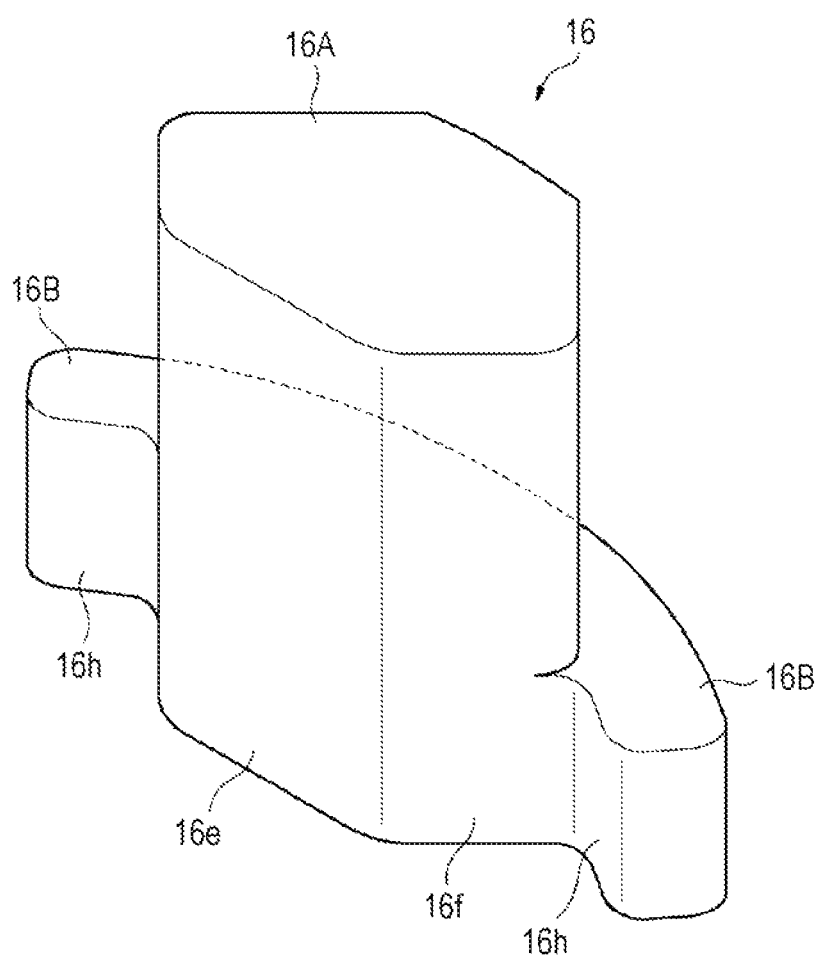
FIG. 10 is a perspective view of the weight when viewed from a different angle.
Figure 11:
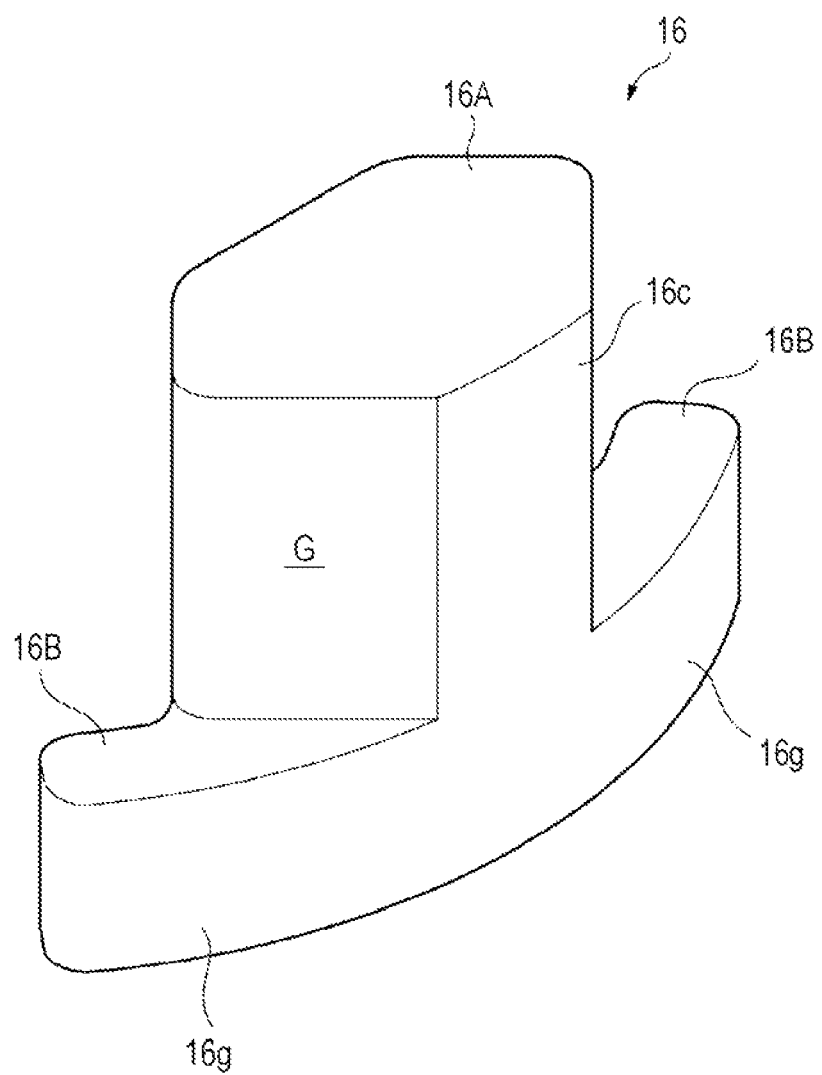
FIG. 11 is a perspective view of the weight when viewed from still a different angle.
Figure 12:
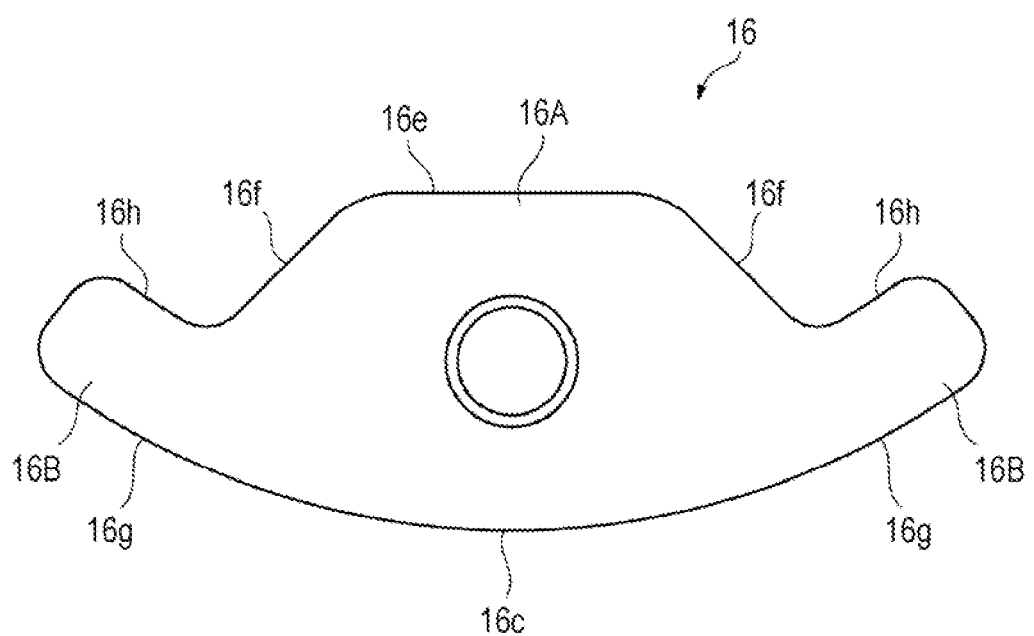
FIG. 12 is a plan view of the weight.
Figure 13:
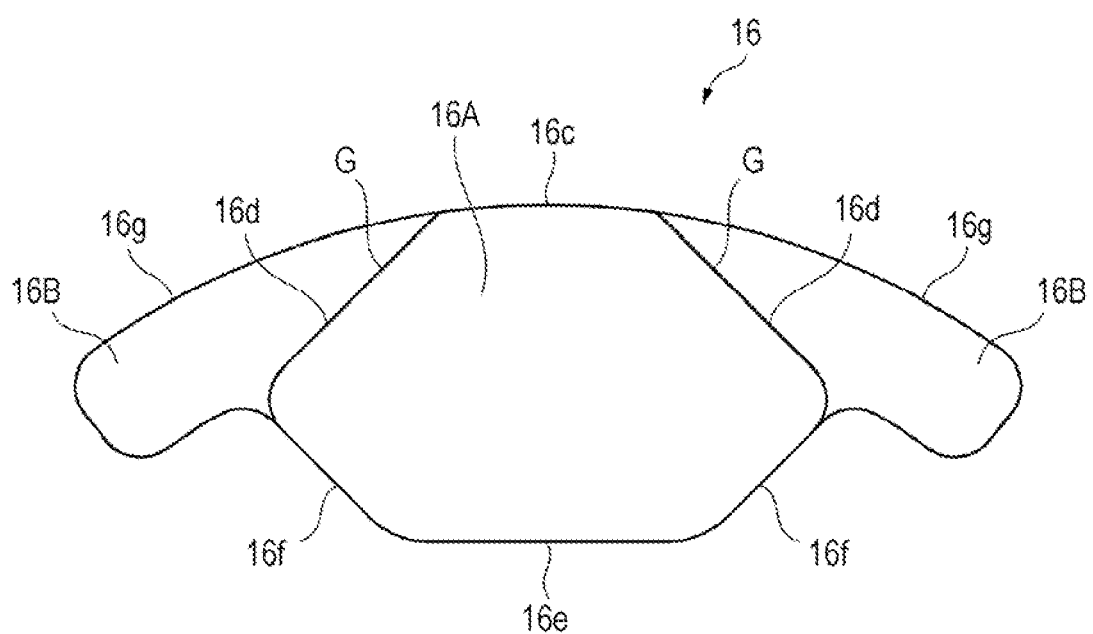
FIG. 13 is a bottom view of the weight.

As shown in FIGS. 2 to 4, the rotor assembly R includes a core 10, resin insulators 11, a commutator 14, a shaft 4, and a weight 16. The core 10 is formed of iron plates that are stacked upon each other. The insulators 11 are provided for guaranteeing electrical insulation at a surface of the core 10. The commutator 14 includes three commutator segments 13 that are mounted to an outer peripheral surface of a cylindrical commutator holder 12. The shaft 4 is press-fitted to the center of the commutator holder 12 of the commutator 14, the insulators 11, and the core 10. The weight 16 is secured to the core 10 formed of tungsten.

The core 10, formed of thin iron plates that are stacked upon each other and that have the same shape, includes three radially disposed arms 10a and crescent-shaped tooth portions 10b disposed at end portions of the corresponding arms 10a. A coil 17 is wound around each arm 10a of the core 10. However, since the core 10 is electrically conductive, the insulators 11 providing electrical insulation are mounted to the surface of the core 10.

As shown in FIGS. 5 to 8, each insulator 11 includes a central portion 11a, arm covering portions 11b, and protrusions 18. Each central portion 11a has the shape of a circular truncated cone. In each insulator 11, each arm covering portion 11b extends radially from the central portion 11a, contacts the entire length of a surface of the corresponding arm 10a of the core 10, and has an angular U-shape in cross section. Each protrusion 18 is provided at an end portion of its corresponding arm covering portion 11b. Each protrusion 18 includes a first protruding portion 18a, a second protruding portion 18b, and a third protruding portion 18c. Each first protruding portion 18a is provided at an end portion of its corresponding arm covering portion 11b and protrudes in a peripheral direction. Each second protruding portion 18b is provided at the end portion of its corresponding arm covering portion 11b and protrudes in the direction of an axis L of the shaft 4. Each third protruding portion 18c protrudes radially outward from the corresponding second protruding portion 18b and contacts a surface of its corresponding tooth portion 10b of the core 10.

Radial slits 11e are formed at a center hole 11d of each central portion 11a. This makes it easy for each center hole 11d to be elastically deformed, and allows the shaft 4 to be reliably press-fitted to each center hole 11d. Each protrusion 18 includes the first protruding portion 18a, the second protruding portion 18b, and the third protruding portion 18c. Each protrusion 18 provides seating stability of the insulators 11 and restricts the position of the weight 16.

As shown in FIGS. 2 to 4, the upper and lower sides of the core 10 are sandwiched by the above-described insulators 11, and the coils 17 are wound around the arm covering portions 11b of the pair of upper and lower insulators 11, so that the coils 17 and the core 10 are electrically insulated from each other. An end of each coil 17 is connected to a corresponding riser 13a extending from the corresponding commutator segment 13. Each riser 13a protrudes from a flange 12a of the commutator holder 12 towards a core slot S formed between adjacent arms 10a of the core 10.

Since the central portion 11a of each insulator 11 has the shape of a circular truncated cone, when an end of each coil 17 is connected to the riser 13a of the corresponding commutator segment 13, it is possible to route the coils 17 along inclined surfaces A of the central portions 11a of the insulators 11. This makes it easy to route the coils 17. In addition, since it is not necessary to exert an unreasonable tension on the coils 17 when routing the coils 17, it is possible to manually connect the coils without breaking the coils. Even when the coils 17 are wound around the arms 10a of the core 10, since the coils 17 slide down along the inclined surfaces A of the central portions 11a, it is possible to reliably wind the coils 17 around the arms 10a.

As shown in FIGS. 9 to 13, the weight 16 that is symmetrically formed on both sides of a plane passing through the axis L (see FIG. 4) includes a columnar body 16A and extension portions 16B. The body 16A is inserted in the core slot S (see FIG. 4) formed at a location between the corresponding adjacent arms 10a of the core 10. The extension portions 16B are disposed at the corresponding end portion of the body 16A and on surfaces of the corresponding tooth portions 10b at the corresponding adjacent arms 10a. Each extension portion 16B protrudes in a peripheral direction from the corresponding end portion of the body 16A so as to have a certain height H and a certain width W.

The body 16A has a substantially hexagonal cross-section columnar shape. The body 16A includes an outermost peripheral surface 16c, outer peripheral surfaces 16d, an innermost peripheral surface 16e, and inner peripheral surfaces 16f. A symmetrical plane Q (see FIG. 3) passing through the axis L crosses the outermost peripheral surface 16c. The outer peripheral surfaces 16d extend along inner peripheral surfaces 10c (see FIG. 4) of the corresponding tooth portions 10b from end portions of the outermost peripheral surface 16c. The symmetrical plane Q passing through the axis L crosses the innermost peripheral surface 16e. The inner peripheral surfaces 16f extend towards the inner peripheral surfaces 10c (see FIG. 4) of the corresponding tooth portions 10b from end portions of the innermost peripheral surface 16e.

The outermost peripheral surface 16c of the body 16A and outer peripheral surfaces 16g of the extension portions 16B are positioned on the same curve. As shown in FIG. 4, the outermost peripheral surface 16c and the outer peripheral surfaces 16g do not extend beyond arcuate outer peripheral surfaces of the corresponding tooth portions 10b of the core 10. The inner peripheral surfaces 10c of the corresponding tooth portions 10b and the outer peripheral surfaces 16d of the body 16A of the weight 16 contact each other, with an adhesive G being applied to this location. The extension portions 16B of the weight 16 may be welded and secured to the corresponding tooth portions 10b.

When the vibration motor 1 is to be assembled, the inner peripheral surfaces 10c of the corresponding tooth portions 10b of the core 10 and the outer peripheral surfaces 16d of the body 16A of the weight 16 contact each other, and the extension portions 16B of the weight 16 contact the corresponding first protrusions 18a of the insulators 11, so that the weight 16 is prevented from falling radially inward.

In the vibration motor 1, each insulator 11 is provided with protrusions 18 that are positioned radially inward from the extension portions 16B, provided at the end portion of the body 16A of the weight 16, and that restrict radial movement of the extension portions 16B. In addition, in the vibration motor 1, the weight 16 is supported by the protrusions 18 of the insulators 11 so as to prevent the weight 16 from falling radially inward. Therefore, when using the vibration motor, the situation in which a force acting radially inward upon the weight 16 is supported only by a weld or an adhesive is prevented from occurring, so that a gradual reduction in the securing strength of the weight 16 does not occur.

In particular, if tungsten is used for the weight 16 and iron is used for the core 10, the weight 16 and the core 10 are less reliably joined to each other due to a difference between the melting points of tungsten and iron; and, if an adhesive is used, the adhesive strength of the adhesive itself is reduced with the passage of time. Therefore, if the weight 16 is supported by the protrusions 18 of the insulators 11 so as to prevent the weight 16 from falling radially inward, it is possible to reliably prevent the weight from being removed from the core.

Further, if the weight 16 tends to fall radially inward when assembling the vibration motor 1, improper securing of the weight 16 with a weld or an adhesive tends to occur, as a result of which the securing strength is less reliably ensured. The structure according to the embodiment can also prevent such a situation from occurring. The weight 16 does not need to be supported by the coils 17 so as to prevent the weight 16 from falling radially inward. This makes it possible to reliably prevent breakage of the coils 17 occurring as a result of contact of the weight 16 with the coils 17. Since the protrusions 18 of the insulators 11 function to restrict the position of the weight 16 when assembling the vibration motor 1, the vibration motor 1 is easily assembled.

As shown in FIG. 4, the protrusions 18 are capable of restricting peripheral-direction movement of the weight 16 by contacting free ends 16a of the weight 16 in a peripheral direction of the extension portions 16B. If such protrusions 18 are used, the position of the weight 16 is more reliably restricted when assembling the vibration motor 1, improper securing of the weight 16 with a weld or an adhesive is less likely to occur, and the securing strength is more reliably ensured.

Each protrusion 18 is disposed radially outward with respect to a straight line connecting both free ends of the corresponding tooth portion 10b of the core 10. If such a structure is used, when the coils 17 are to be wound around the arms 10a of the core 10, it is possible to prevent the protrusions 18 of the insulators 11 from hindering the winding of the coils 17, and from reducing the amount of coil 17 that is wound around the arms 10a. Further, the protrusions 18 can reliably control ends of the positions of the windings of the coils 17. This makes it possible for the coils 17 to be reliably wound. Since, in the flat vibration motor 1, the space for setting the weight is very small, a space for setting the weight can be reliably provided in a small volume.

The present invention is not limited to the above-described embodiment, so that various modifications can be made within a scope that does not depart from the gist of the present invention.

For example, although not illustrated, the first protrusions 18a may extend along inner peripheral surfaces 16h (see FIG. 4) of the corresponding extension portions 16B of the weight 16.

The vibration motor according to the embodiment of the present invention is described above in various ways. The vibration motor 1 may be installed in a portable communication device such as a smart phone or a mobile telephone and used as a vibration generating source having, for example, a call function. By installing the vibration motor 1 in a game machine and driving the vibration motor 1 in accordance with the progress of a game, the vibration motor 1 can be used as a vibration generating source that creates a sense of realism to an operator.

Figure 14:
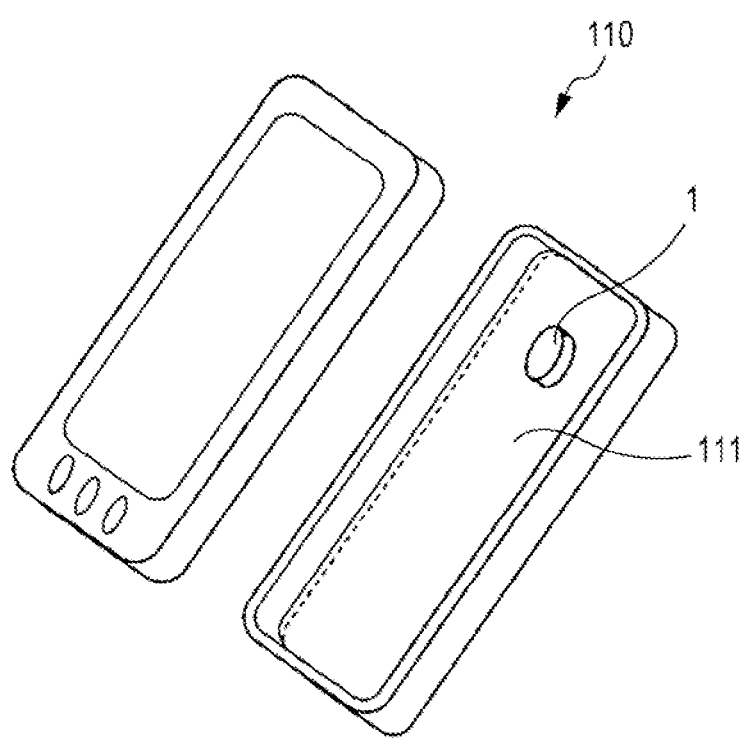
FIG. 14 illustrates a portable communication device including the vibration motor.

As shown in FIG. 14, by installing the vibration motor 1 in the interior of a housing of a smart phone 110, it is possible to form a portable communication device having a vibration notifying function. By electrically connecting a circuit board 111 of the smart phone 110 and the vibration motor 1 to each other, it is possible to use the vibration motor 1 as a vibration generating source. For example, when one gets a phone call, vibration is generated when an operation is performed.

Figure 15:
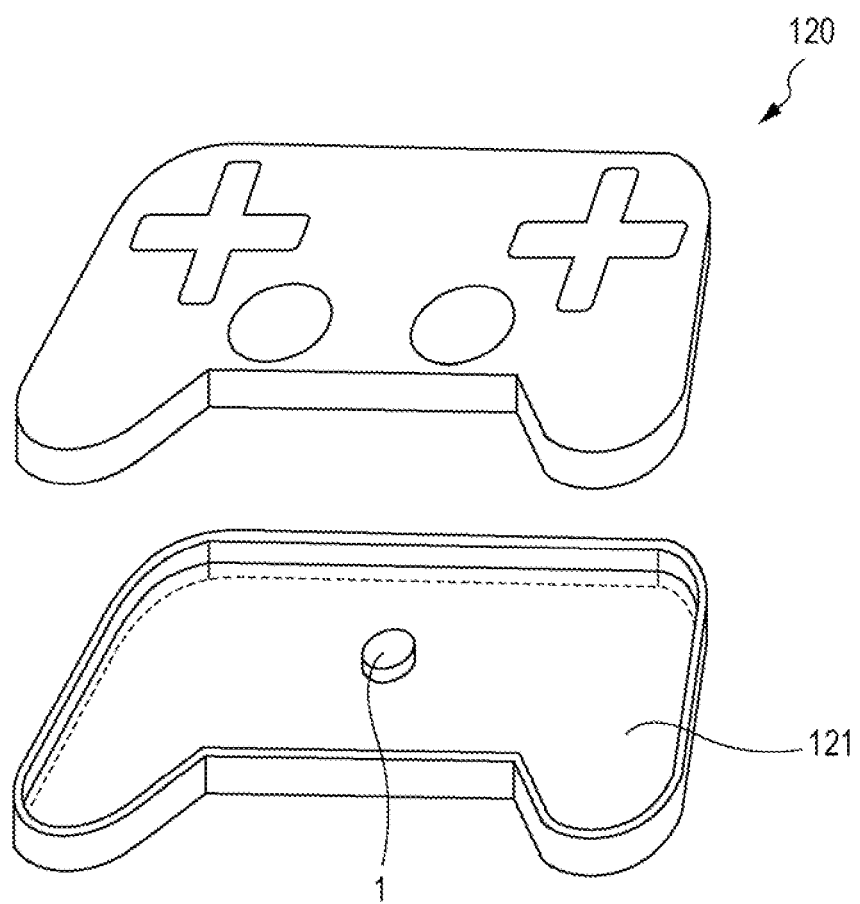
FIG. 15 illustrates a game machine including the vibration motor.

As shown in FIG. 15, it is possible to install the vibration motor 1 in the interior of a housing of a controller 120 of a game device and form a game machine including a vibration notifying function. By electrically connecting a circuit board 121 of the controller 120 and the vibration motor 1 to each other, it is possible to use the vibration motor 1 as a vibration generating source. The game machine may be, for example, the body of a portable game machine or a handle of a pinball machine. In order to create a sense of realism to an operator, these machines generate vibration in accordance with the state of progress of a game.

What is claimed is:

1. A vibration motor comprising:
a core including a plurality of radially disposed arms and a plurality of tooth portions, each tooth portion being provided at an end portion of the corresponding arm;
an insulator that is disposed on a surface of the core, the insulator being formed of an electrical insulating material, a coil being wound around the insulator disposed on the arms; and
a weight that is disposed in a core slot provided between adjacent arms of the plurality of arms, wherein the weight includes a body and extension portions, the body being inserted in the core slot, the extension portions being provided at an end portion of the body and being disposed on the corresponding tooth portions at the adjacent arms, and wherein the insulator includes protrusions that are positioned radially inward from the extension portions and that restrict radial movement of the extension portions.

2. The vibration motor according to claim 1, wherein the protrusions restrict peripheral-direction movement of the weight by contacting free ends of the weight in a peripheral direction of the extension portions.

3. The vibration motor according to claim 1 wherein each protrusion is disposed radially outward with respect to a straight line connecting both ends of the corresponding tooth portion of the core.

4. The vibration motor according to claim 2, wherein each protrusion is disposed radially outward with respect to a straight line connecting both ends of the corresponding tooth portion of the core.

* * * * *